Patented Oct. 2, 1951

2,569,671

UNITED STATES PATENT OFFICE 2,569,671

PURIFICATION OF CRUDE ALCOHOLS

William B. Hughes, Barnsdall, and Jack Newcombe, Pawhuska, Okla., assignors to Cities Service Oil Company, Bartlesville, Okla., a corporation of Delaware No Drawing. Application July 16, 1948,
Serial No. 39,188

12 Claims. (Cl. 260—643)

This invention relates to the purification of crude alcohols and more particularly to the purification of alcohols containing carbonyl and acetal impurities.

In commercial processes such as those involving the oxidation of natural gas or the various Fischer-Tropsch processes, alcohols are produced as products of the reactions. These alcohols are almost invariably contaminated with close boiling carbonyl and acetal impurities, and it is impractical to separate these impurities from the alcohols by ordinary fractionation. Various chemical processes have been used for purification of such impure alcohols, but a complete removal of the carbonyl impurities is almost impossible to obtain by chemical means. Likewise, solvent extraction, while useful, does not completely succeed in eliminating the undesirable impurities, which impart an off odor to the alcohols.

It is an object of this invention to purify alcohols containing carbonyl impurities and to recover as a final product chemically pure alcohols.

It is a further object of this invention to increase the yield of alcohols from a crude alcohol solution containing carbonyl impurities by converting the impurities into the corresponding alcohols, thereby increasing the total alcohol recovery from the process.

We have found that such alcohols may be purified by subjecting them to hydrogenation at a temperature of from 100° C. to 250° C. and at pressures of from 500 to 1500 p. s. i. g. at the start, the pressure rising during the reaction to a maximum of 3000 p. s. i. g.

The reaction may be assisted by various catalysts, among which the most satisfactory proved to be platinized nickel, supported nickel, and Raney nickel. Other catalysts which showed some promise included palladinized nickel, platinum black, palladium black, and copper, iron, aluminum, cobalt, cadmium, and nickel chromites.

The Raney nickel catalyst was prepared from patented Raney catalyst powder by dissolving the aluminum from the nickel alloy using sodium hydroxide. Iron, aluminum, cobalt, cadmium and nickel chromites were prepared according to the directions given by Lozier in U. S. Patent 2,077,421. The platinized and palladinized nickel catalysts were prepared by adding a solution of platinum or palladium chloride to aqueous suspension of Raney catalyst, then effecting a plating by addition of sodium hydroxide. Platinum and palladium black were prepared by precipitating the metals from the chloride salts using acidized solution and zinc dust.

In order to completely hydrogenate the impurities, it has been found necessary to add a very small quantity of acid such as sulfuric or phosphoric acid to hydrolyze the acetals present. The acid need not be present in any large amount, as low as one drop to 500 cc. giving good results, with the best results being obtained by the addition of 0.1 per cent acid. Acid concentrations up to 1 per cent have been successfully used.

The water content of the solution is also an important factor. Too much water tends to inhibit the hydrogenation, while absence of water will prevent proper acetal hydrolysis, which makes the hydrogenation more difficult to carry out. We have found that hydrogenation proceeds most smoothly when about 10 to 15 per cent of water is present in the solution, although the water content may be varied from these limits rather widely.

The alcohols used by us as starting materials were derived from the oxidation of natural gas and generally contained from 6 to 8 per cent of carbonyl impurities, of which from 5 to 6 per cent were aldehydes and from 1 to 3 per cent were ketones. The alcohols had an average unsaturation bromine number of approximately 160 and contained from 60 to 70 per cent of methanol and from 10 to 15 per cent water, the remainder being higher alcohols. The acidity of the starting material ranged up to as much as 0.10 to 0.15 per cent. After treatment with hydrogen as described above, an analysis of the hydrogenated material indicated an acidity of from 0.02 to 0.03 per cent, together with the complete absence of carbonyls, either aldehydes or ketones and unsaturates. The methanol content had been increased by about 1 to 3 per cent, and the content of higher alcohols had been increased to about 17 to 25 per cent. It was found that the various alcohols could be easily separated by fractional distillation and as chemically pure products.

For example, a sample which before hydrogenation had the following analysis:

| | |
|---|---|
| Gravity at 20° C | 0.835 |
| Acidity calculated as formic acid, percent | 0.12 |
| Carbonyls (as $C_3$), percent | 8.00 |
| Aldehydes (as $C_3$), percent | 6.60 |
| Ketones (as $C_3$), percent | 1.40 |
| Methanol, percent | 71.00 |
| Higher alcohols, percent | 11.98 |
| Water, percent | 8.9 |
| Unsaturation (mg.B.R./ml.) | 162 | after hydrogenation gave the following analysis:

| | |
|---|---|
| Gravity at 20° C | 0.810 |
| Acidity calculated as formic acid, percent | 0.13 |
| Carbonyls (as $C_3$), percent | 0.00 |
| Aldehydes (as $C_3$), percent | 0.00 |
| Ketones (as $C_3$), percent | 0.00 |
| Methanol, percent | 74.00 |
| Higher alcohols, percent | 17.1 |
| Water, percent | 8.9 |
| Unsaturation | None |

The higher alcohols upon fractionation were found to comprise ethanol, 2-propanol, 1-propanol, 2-butanol, 2-methylpropanol-1, 1-butanol, mixed pentanols, and mixed higher alcohols.

The methanol was fractionated from the hydrogenated material and gave the following analysis:

| | |
|---|---|
| Acid color | None |
| Ketones | None |
| Higher alcohols | None |
| Gravity at 20° C | 0.793 |
| Permanganate time, hours | 1½ |
| Odor | 4414 |
| Boiling range, °C | 64.5–64.8 |

In order that those skilled in the art may more clearly understand our new process, the following examples are given. It will be understood, of course, that the examples given are not to be construed as limiting our invention, since alcohols containing other carbonyl and acetal impurities, and unsaturates, or various proportions of the same, may be equally successfully treated.

*Example 1*

Five hundred ml. of a fraction of crude alcohols boiling as azeotropes between 58° and 89° C. produced by the controlled oxidation of natural gas, containing in addition to the various alcohols 6.6 weight per cent aldehydes calculated as propionaldehyde, 1.4 weight per cent ketones calculated as acetone, 8.9 weight per cent water, unsaturation equal to 162 mg./ml. of bromine and approximately 2 per cent by weight of acetals calculated as dimethylacetal, were charged to a high pressure hydrogenation apparatus together with 0.5 gram of concentrated sulfuric acid and 2 weight per cent of copper chromite as a catalyst. Hydrogen was then introduced until the gauge pressure reached 1500 p. s. i. g., then heating and shaking was started until a temperature of 200° C. was attained on the inside of the bomb at which time the pressure had reached 2600 p. s. i. g. The temperature was held at this point for 5 hours, at the end of which time the pressure within the bomb had dropped to a constant level, and the bomb was cooled and the charge was removed. The material was found to be completely freed of carbonyl, acetal and unsaturated contaminants. Fractionation of the mixture gave alcohols which met the American Chemical Society standards with no further treatment.

*Example 2*

Five hundred ml. of the above-described crude alcohols was treated in a similar manner using as a catalyst 0.5 gram of concentrated sulfuric acid and 20 weight per cent Raney nickel catalyst. In this case the pressure at start was again 1500 p. s. i. g. but at 200° C. the pressure went to 2870 p. s. i. g. The agitation was allowed to continue for 30 minutes at 200° C. until the pressure had dropped to a constant level. The bomb was then cooled and the charge was removed. The material was found to be free from carbonyl, acetal, and unsaturated contaminants. Fractionation of the mixture gave alcohols which met the American Chemical Society standards with no further treatment.

*Example 3*

Five hundred ml. of the above-described crude alcohols was treated in a similar manner using as a catalyst 0.5 gram of concentrated sulfuric acid and 5 weight per cent of a Raney nickel catalyst promoted by platinum prepared in the manner described by Delepine and Horeau (Compt. rend. 201, 1301-5 (1935)). In this case the starting pressure was again 1500 p. s. i. g. but at 200° C. the pressure went to 2620 p. s. i. g. The shaking was allowed to continue for one hour at this temperature at the end of which time the pressure had dropped to a constant level. The bomb was then cooled and the charge was removed. The material was found to be free from carbonyl, acetal, and unsaturated contaminants. Fractionation of the mixture gave alcohols which met American Chemical Society standards with no further treatment.

*Example 4*

Five hundred ml. of the above-described crude alcohols was treated in a similar manner using as a catalyst 0.5 gram of concentrated sulfuric acid and 5 weight per cent of a supported nickel catalyst promoted with manganese and aluminum. This catalyst was prepared by precipitating nickel, aluminum and manganese nitrates on a diatomaceous earth of the type used as a filter aid and then reducing the nitrates with hydrogen.

In this case the pressure at the start was again 1500 p. s. i. g. but at 200° C. it went to 2570 p. s. i. g. The reaction was allowed to proceed for one hour at 200° C. The bomb was then cooled and the contents removed for analysis. The mixture was found to be completely free of carbonyl, acetal, and unsaturated contaminants. Fractionation of the mixture gave alcohols which met the American Chemical Society standards with no further treatment.

While sulfuric acid is specified in the foregoing examples, any other nonvolatile mineral acid may be used, and we have found that the addition of the same percentage of phosphoric acid gives equally good results.

The presence of acid is essential in the case of crude alcohols containing aldehyde impurities, since these impurities always react with the alcohols to form acetals. Acetals as such cannot be successfully hydrogenated to alcohols, and it is therefore necessary to hydrolyze them to the corresponding alcohols and aldehydes. The acid acts as a hydrolyzing catalyst, liberating aldehydes which then react with hydrogen to form alcohols.

We have further found that the higher boiling impurities are more difficult to hydrogenate than those in the lower boiling range. For example, the crude alcohols boiling between 58° and 89° C. as azeotropes used in the foregoing examples were fractionated into a cut boiling below 66° C., and a residue boiling above 66° C. It was found that if the fraction below 66° C. were hydrogenated at 1500 p. s. i. g. and 200° C. for about ten minutes, a very pure grade of methanol could be produced. At 500 p. s. i. g. and 200° C., purity was attained in about twenty minutes, while at 500 p. s. i. g. and 100° C., one hour was required. It is not necessary, however, to go to these lower pressures and temperatures when hydrogenating a low-boiling impure alcohol cut, since, higher temperatures and pressures up to 250° C. will not adversely affect the quality of the alcohols produced. At temperatures above 250° C. there is, however, some danger of cracking the alcohols.

It will thus be seen that by means of our new and improved process, purified alcohols may be obtained from carbonyl contaminated stocks at low cost, and that the impurities themselves may be converted into salable products. The conditions of hydrogenation depend in large part upon the nature of the impurities sought to be hydrogenated, but by proper control a complete cleanup of the crude alcohols may be assured.

Having thus described our invention, what is claimed is:

1. The process of purifying crude alcohol solutions comprising treating an aqueous crude alcohol solution containing carbonyl and acetal impurities with hydrogen at temperatures of from about 100° C. to about 250° C. and at pressures of from about 500 p. s. i. g. to 3000 p. s. i. g. in the presence of a catalyst selected from the group consisting of platinized nickel, supported nickel, Raney nickel, palladinized nickel, platinum black, palladium black, copper chromite, cobalt chromite, and iron chromite, and in the presence of from about 0.005 to about 1.0 per cent of a mineral acid from the group consisting of sulfuric and phosphoric acids.

2. The process according to claim 1 in which the aqueous solution of crude alcohols contains from about 10 per cent to about 15 per cent of water.

3. The process according to claim 1 in which the catalyst is platinized nickel.

4. The process according to claim 1 in which the catalyst is Raney nickel.

5. The process according to claim 1 in which the catalyst is supported nickel.

6. The process according to claim 1 in which the acid is sulfuric acid.

7. The process according to claim 1 in which the acid is phosphoric acid.

8. The process of purifying crude alcohol solutions comprising treating an aqueous crude alcohol solution containing carbonyl and acetal impurities with hydrogen at a temperature of about 200° C. and at a pressure of from about 2500 p. s. i. g. to about 2900 p. s. i. g. for a sufficient time to convert the carbonyl and acetal impurities to the corresponding alcohols, in the presence of a nickel catalyst and in the presence of from about 0.005 per cent to about 1.0 per cent of a mineral acid selected from the group consisting of sulfuric acid and phosphoric acid.

9. The process according to claim 8 in which the acid is sulfuric acid.

10. The process according to claim 8 in which the acid is phosphoric acid.

11. The process according to claim 8 in which the water content of the aqueous crude alcohol solution is from about 10 per cent to about 15 per cent and in which the acid is phosphoric acid.

12. The process according to claim 8 in which the water content of the aqueous crude alcohol solution is from about 10 per cent to about 15 per cent and in which the acid is sulfuric acid.

WILLIAM B. HUGHES.
JACK NEWCOMBE.

REFERENCES CITED

The following references are of record in the file of this patent:

UNITED STATES PATENTS

| Number | Name | Date |
|---|---|---|
| 1,684,640 | Schmidt et al. | Sept. 18, 1928 |
| 1,921,381 | Beller et al. | Aug. 8, 1933 |
| 2,205,184 | Woodhouse | June 18, 1940 |
| 2,276,142 | Atwood | Mar. 10, 1942 |

FOREIGN PATENTS

| Number | Country | Date |
|---|---|---|
| 350,502 | Great Britain | June 15, 1931 |

OTHER REFERENCES

Fieser and Fieser, "Organic Chemistry," page 221, published by D. C. Heath & Co., Boston, 1944.